United States Patent [19]
Jalbert

[11] 3,821,861
[45] July 2, 1974

[54] TRAP FOR FISHING

[76] Inventor: Donald A. Jalbert, 134 South St., Biddeford, Maine 04005

[22] Filed: Oct. 2, 1972

[21] Appl. No.: 293,832

[52] U.S. Cl. ................................. 43/65, 43/100
[51] Int. Cl. .......................................... A01k 69/08
[58] Field of Search ..................... 43/100, 105, 65

[56] References Cited
UNITED STATES PATENTS

| | | | |
|---|---|---|---|
| 544,100 | 8/1895 | Hurst | 43/65 |
| 980,148 | 12/1910 | Garrard | 43/105 UX |
| 1,074,276 | 9/1913 | Masek | 43/105 |
| 2,119,828 | 6/1938 | Nordenstam | 43/100 |
| 3,271,894 | 9/1966 | Manno et al. | 43/65 |

Primary Examiner—Louis G. Mancene
Assistant Examiner—Daniel J. Leach
Attorney, Agent, or Firm—Bacon & Thomas

[57] ABSTRACT

A trap is formed from three plastic rectangular side panels with flow openings therethrough, the side panels being secured to a plurality of triangular plastic panels arranged in spaced, parallel relationship to thereby form a triangular enclosure. Trap nets are removably mounted in the end panels of the triangular trap enclosure, and function to trap a variety of fish. In one embodiment an emptying door is provided in an end panel, while in a second embodiment the emptying door is placed in one of the rectangular side panels. The trap is weighted to secure it in position.

5 Claims, 8 Drawing Figures

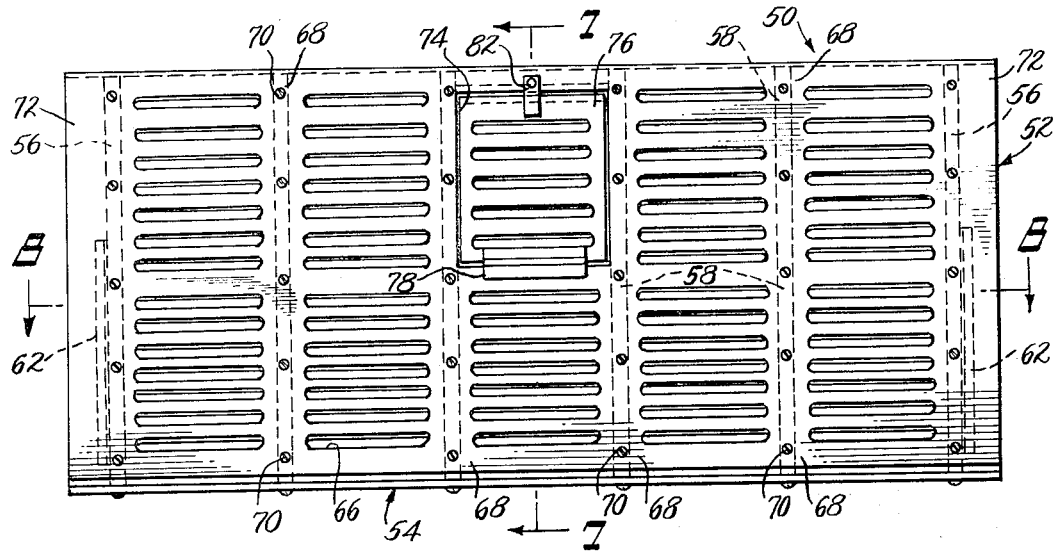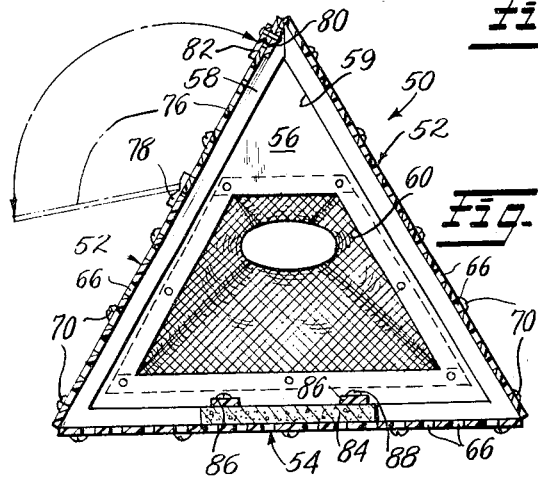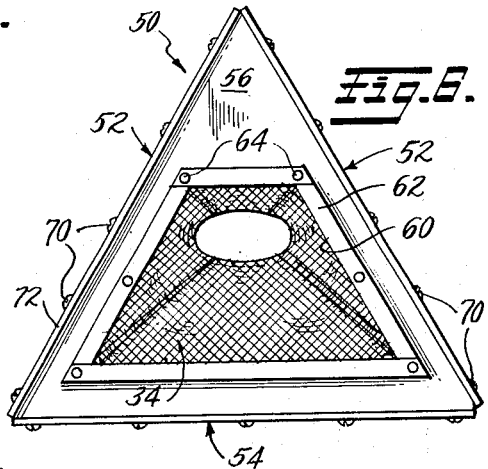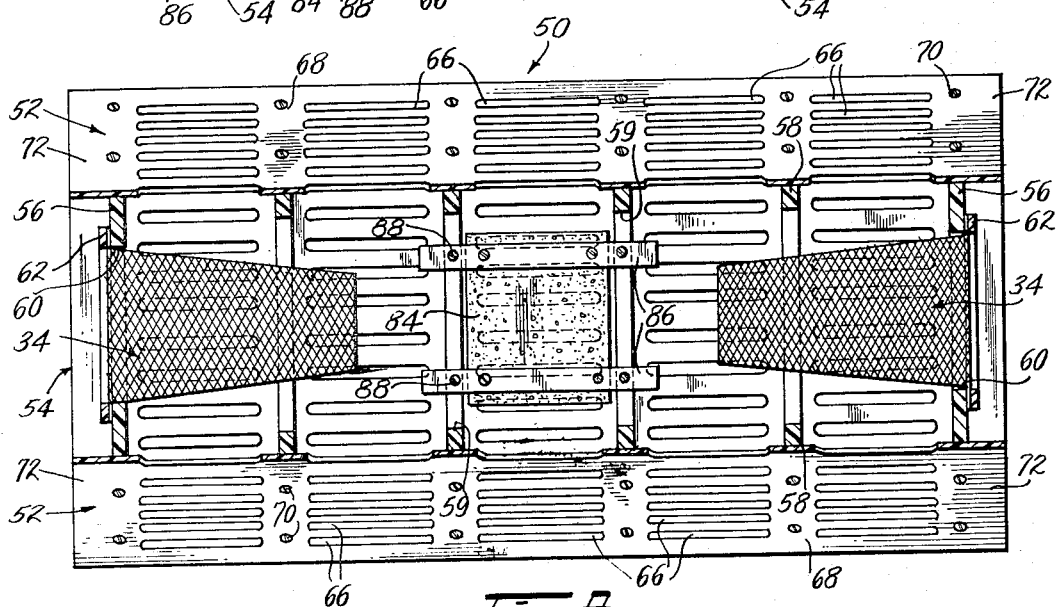

3,821,861

TRAP FOR FISHING

BACKGROUND OF THE INVENTION

1. Field of the Invention

The present invention relates generally to traps for use in fishing, and more particularly to an improved trap capable of use to capture a wide variety of fish and which will remain in position when set.

2. Description of the Prior Art

Trapping as a means for securing lobsters, fish and other sea life has long been known, and many different traps have been constructed. Usually, such traps are made of wood, which tends to rot over a period of time, or of metal. While metal traps are durable, they are also heavy to use, and noise in their handling is almost inevitable, noise being an undesirable occurrence when operating in fishing waters because it can drive away fish.

Ideally a fish trap should be light in weight while being designed to remain in place when set, and should be durable and so constructed as to be easily placed and removed with a minimum of noise. The present invention is directed to an improved trap construction designed to overcome the deficiencies of past known traps, and to satisfy the ideal characteristics just mentioned for a trap.

SUMMARY OF THE INVENTION

The trap of the present invention is made of a suitable plastic, such as high density polyethylene, which thereby makes it light in weight, silent in operation, and extremely durable. The use of plastic for fish traps is, of course, not new, and indeed the applicant herein is the inventor in patent application, Ser. No. 109,768 (now U.S. Pat. No. 3,708,905), for a lobster trap made of plastic. However, until the present invention the combined characteristics of stability while in place, silent operation, structural stability and ease of construction were not found in a fish trap.

The present trap is triangular in shape, which gives it great structural strength while at the same time allowing the use of sheet materials for its construction. The trap includes three rectangular side panels made of plastic, each with flow openings therethrough, and a plurality of triangular panels. The triangular panels are arranged in parallel, spaced relationship, and the rectangular side panels are secured thereto by screws passed through holes in the side panels and threaded into the edges of the triangular panels.

Two of the triangular panels constitute the end panels of the resultant triangular enclosure. In a first embodiment of the invention, both of said end panels have openings cut therein, one of said openings having a plastic fish trap net removably mounted therein, and the other opening being fitted with a door. The one or more triangular panels intermediate said end panels have the central portions thereof cut away, to provide a continuous interior for the trap.

In a second embodiment of the invention, both end panels are fitted with fish trap nets, and the door to the enclosure is mounted in an opening provided in one of the side panels.

In both embodiments of the invention, weights cast from concrete or the like are disposed within the trap on the bottom wall, and serve to hold the trap in place. When placed on the bottom of a body of water, the weighted triangular trap stays firmly in place, the inclined side walls thereof offering little resistance to wave and current action. At the same time, the triangular configuration provides a structurally strong trap, one that is difficult to crush or damage.

It is a principal object of the present invention to provide a fish trap that can be easily manufactured from sheets of plastic, and which is of rugged construction and easily handled.

Another object is to provide a triangular fish trap with fish trap nets removably mounted in the end panels thereof, whereby they are easily changed.

A further object is to provide a triangular fish trap which can be handled in relative silence, and which will be durable in operation.

Other objects and many of the attendant advantages of the present invention will become readily apparent from the following Description of the Preferred Embodiments, when taken together with the accompanying drawings.

BRIEF DESCRIPTION OF THE DRAWINGS

FIG. 5 is a side elevational view of a modified embodiment of the trap of the invention, wherein the access door is placed in one of the rectangular side panels;

FIG. 6 is an end elevational view of the trap of FIG. 5, as viewed from the right end thereof;

FIG. 7 is a vertical sectional view taken on the line 7—7 of FIG. 5 showing the construction of the access door; and FIG. 8 is a longitudinal horizontal sectional view taken on the line 8—8 of FIG. 5, showing the interior arrangement of the trap.

DESCRIPTION OF THE PREFERRED EMBODIMENTS

Figure 1:
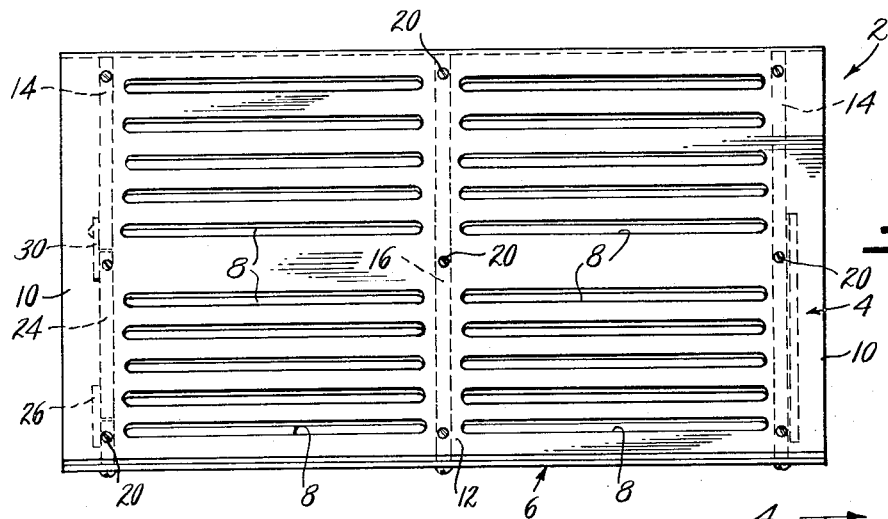
FIG. 1 is a side elevation of a first embodiment of the trap of the invention, wherein the access door to the trap is located in one of the triangular end panels.
Figure 3:
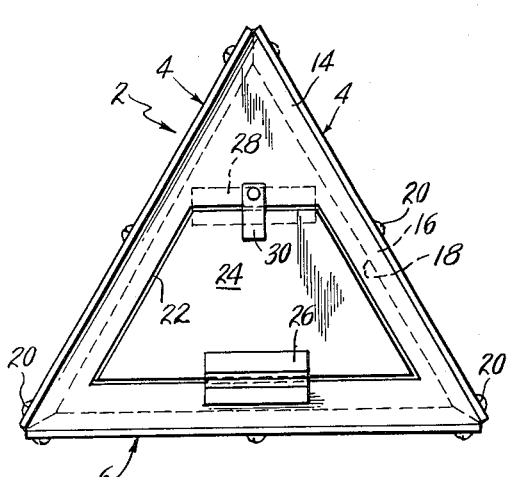
FIG. 3 is an elevational view of the trap of FIG. 1, as viewed from the left end thereof, and showing the access door.
Figure 2:
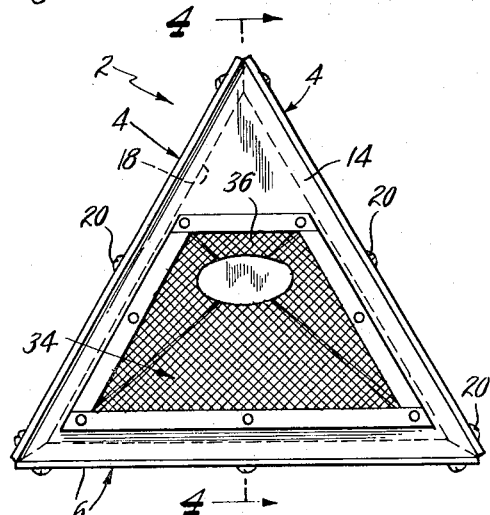
FIG. 2 is an end elevational view of the trap of FIG. 1, as viewed from the right end thereof, showing the removably mounted fish trap net.
Figure 4:
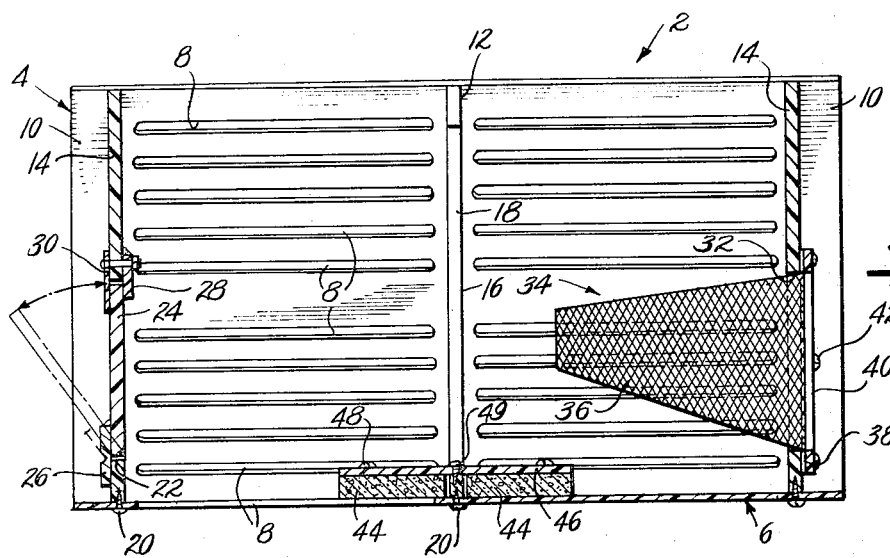
FIG. 4 is a longitudinal vertical sectional view, taken on the line 4—4 of FIG. 2.

Referring now to FIGS. 1–4 of the drawings, a first embodiment of the trap of the invention is indicated generally at 2 therein, said trap being especially suited for use in obtaining crawdads, eels and minnows. It has been found through actual use that these fish and others with similar habits are attracted to the trap 2 of FIGS. 1–4, and that the trap 2 is ideally suited to their capture.

The trap 2 is made of plastic panels, and can be easily constructed. The sides 4 and bottom 6 of the trap 2 comprise rectangular plastic panels of identical configuration, each having a plurality of longitudinally extending slot openings 8 cut therein to provide flow therethrough, but not of such a size as to allow escape of the fish being sought. The slots 8 do not extend for the full length of the panels 4 and 6, but rather are arranged in sets spaced along the length of the panels, with uninterrupted end strips 10 being provided on the panels, and with at least one center strip 12 being left. The number of center strips 12 employed will depend on the length of the triangular trap 2, since such center strips are utilized to place the internal triangular panels that act as reinforcing ribs. Obviously, if the rectangular panels 4 and 6 are of great length, then in order to provide adequate structural stability more than one center reinforcing rib may be desirable, in which instance more than one center strip 12 would be utilized.

The rectangular side and bottom panels 4 and 6 are mounted in position on spaced, parallel triangular end panels 14 and at least one triangular center reinforcing panel 16, the center panel 16 acting as an internal reinforcing rib, as has been explained, and having a large triangular cut-out 18 therein whereby to provide a substantially continuous and uninterrupted interior for the trap 2. Each rectangular panel 4 or 6 is secured to one of the three edges of the end panels 14 and the center reinforcing panel 16 by stainless steel screw fasteners 20, it having been found that six screws will be adequate for the average size rectangular panel three in each of the end panels 14 and 16. The rectangular panels have holes bored therein to receive the screw fasteners 20, and such fasteners are merely screwed into the edges of the triangular panels 14 and 16.

One of the end panels 14, the left-hand one as shown in FIG. 1, is provided with a trapezoidal opening 22 therein that provides access to the interior of the trap. The opening 22 is closed by a similarly shaped door 24 of plastic, which is secured along its bottom edge by a hinge plate 26 of plastic that is secured to the door 24 and the end panel 14 by suitable means, such as adhesive. On the interior of the end panel 14 centrally of the top edge of the opening 22 the panel has a stop member 28 mounted to prevent the door 24 from entering the trap, and a latch 30 is pivoted to said end panel above the opening 22 to secure the door in a closed position.

The other end panel 14, the right-hand one as shown in FIG. 1, has a trapezoidal opening 32 therein, identical in configuration to the opening 22. Thus, the end panels 14 are initially of the same configuration, a fact that contributes to economy of construction. Received through the trapezoidal opening 32 is a self-supporting plastic fish trap net 34, comprising a funnel-like body 36 having a flange 38 on the larger end thereof. The flange 38 is fitted against the outer face of the end panel 14 about the periphery of the opening 32, and the net 34 is secured in position by a flange ring 40 secured in position by stainless steel screw fasteners 42.

The plastic trap 2 of FIGS. 1–4 is weighted to hold such in place on the bottom, the weight consisting of slabs of concrete 44 placed within the trap 2 to rest on the bottom panel 6 on either side of the center triangular reinforcing panel 16. The weight slabs 44 are held in position by plastic straps 46 secured thereto by fasteners 48, and which are secured to the interior edge of the triangular central panel 16 by screws 49. The slab weights 44 are thus easily installed and removed, and can be interchanged to provide the correct weight required for the waters being worked.

In operation, the trap 2 is usually taken by boat to the fishing grounds, the construction thereof allowing for easy handling, and the use of plastic in its construction minimizing the generation of noise. The trap is lowered over the side, and is allowed to come to rest with the bottom panel 6 resting on the bottom of the body of water. While the trap 2 is so positioned, the side panels 4 thereof, being mounted on the sides of the equilateral triangular end panels 14 and center panel 16, allow water moved by the current or waves to flow easily thereover without causing walking or traveling of the trap. Further, the great structural strength inherent in a triangular configuration prevents the trap 2 from being crushed or damaged, even though such is made of normally flexible light plastic panels.

The fish enter the trap through the net 34, and at the end of the fishing period the trap 2 is lifted back on board a boat, it being an easy matter to hook one of the openings 8 to lift the same. Thereafter, the access door 24 is opened, to remove the fish.

Referring now to FIGS. 5–8, a second embodiment of the trap of the invention is indicated generally at 50, the trap 50 having been found through use to be ideally suited for capturing lobster, shrimp and cray fish. The trap 50 is longer than the trap 2, and is made from rectangular side panels 52 and a rectangular bottom panel 54 mounted on triangular end panels 56 identical to the end panels 14, and triangular central reinforcing panels 58 identical to the central panel 16, and which have triangular cut-outs 59 therein. The end panels 56 have trapezoidal openings 60 cut therein, within each of which is mounted a fish trap net 34, by use of a flange 62 and screw fasteners 64.

The side panels 52 and the bottom panel 54 have longitudinally spaced sets of longitudinally extending slot openings 66 separated by center strips 68 for mounting of the rectangular panels to the spaced reinforcing panels 58 by stainless steel threaded fasteners 70. In FIGS. 5–8 there are four panels 58, although the number employed will obviously depend on the length of the trap 50. Uninterrupted end strips 72 are provided on each of the rectangular panels 52 and 54, for mounting said rectangular panels on the triangular end panels 56.

In order to provide access to the interior of the trap 50, one of the side panels 52 has a rectangular opening 74 cut therein near the top of the trap 50, and located between two of the center reinforcing panels 58. A door 76 is fitted within said opening, and is secured in place by a hinge plate 78 disposed centrally of its bottom edge, the hinge plate 78 being secured in position by adhesive or other suitable fasteners. A stop plate 80 is secured to the interior of the side panel 52 at the top of the opening 74, and the door 76 is secured closed by a pivoted latch 82.

The trap 50 is weighted by cast concrete weight slabs 84, secured in place by plastic strips 86 and screws 88. In use the trap 50 retains all the advantages of the trap 2 as to stability and structural strength. In addition, because it employs two trap nets 34, one in either end, it is better suited to the capture of lobster, shrimp and cray fish, the added length of the trap providing a larger interior volume for reception of the catch.

It is thus seen that a fish trap has been provided which fulfills all of the objects hereinabove set forth. Obviously, many modifications and variations therein are possible.

I claim:

1. A fish trap, comprising: a pair of unitary rectangular side panels and a unitary rectangular bottom panel, said side panels and said bottom panel having longitudinally extending slot openings cut therein to allow flow therethrough; a pair of unitary triangular end panels and at least one unitary central triangular reinforcing panel disposed between said end panels, said side and bottom panels being fixedly secured to the edges of said triangular end and central panels to form a rigid triangular enclosure, the central portion of said central panel being cut away, and at least one of said end panels having an opening therein; fish trap net means mounted in said opening in said one end panel; (and) access door means provided in one of said panels; separable weight means received within said enclosure and adapted to lie upon said bottom panel; and anchor means for securing said separable weight means in position.

2. A fish trap as recited in claim 1, wherein all of said panels are made of plastic.

3. A fish trap as recited in claim 1, wherein said slot openings are arranged in longitudinally spaced sets, to provide uninterrupted strips on said side and said bottom panels for attachment to said end and center panels.

4. A fish trap as recited in claim 1, wherein said access door means is provided in the other of said end panels, and said net means is removably mounted.

5. A fish trap as recited in claim 1, wherein both of said end panels have openings therein, both of said openings having fish trap net means removably mounted therein, and wherein said access door means is provided in one of said side panels.

* * * * *